(12) United States Patent
Shuto et al.

(10) Patent No.: US 11,518,101 B2
(45) Date of Patent: Dec. 6, 2022

(54) THREE-DIMENSIONAL STRUCTURE AND METHOD OF MANUFACTURING THREE-DIMENSIONAL STRUCTURE

(71) Applicant: Sony Corporation, Tokyo (JP)

(72) Inventors: Aya Shuto, Kanagawa (JP); Kenichi Kurihara, Kanagawa (JP); Nobuhiro Kihara, Aichi (JP); Yusuke Kajio, Tokyo (JP); Tomomasa Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 569 days.

(21) Appl. No.: 16/615,037

(22) PCT Filed: Apr. 11, 2018

(86) PCT No.: PCT/JP2018/015204
§ 371 (c)(1),
(2) Date: Nov. 19, 2019

(87) PCT Pub. No.: WO2018/211871
PCT Pub. Date: Nov. 22, 2018

(65) Prior Publication Data
US 2020/0207020 A1 Jul. 2, 2020

(30) Foreign Application Priority Data

May 19, 2017 (JP) .............................. JP2017-099628

(51) Int. Cl.
*B29C 64/30* (2017.01)
*B33Y 10/00* (2015.01)
*B33Y 70/00* (2020.01)
*B33Y 80/00* (2015.01)
*B33Y 40/20* (2020.01)
*B29C 64/147* (2017.01)
*B29K 105/00* (2006.01)

(52) U.S. Cl.
CPC ............ *B29C 64/30* (2017.08); *B29C 64/147* (2017.08); *B33Y 10/00* (2014.12); *B33Y 40/20* (2020.01); *B33Y 70/00* (2014.12); *B33Y 80/00* (2014.12); *B29K 2105/0032* (2013.01)

(58) Field of Classification Search
CPC ................................................... B29C 64/124
See application file for complete search history.

(56) References Cited

U.S. PATENT DOCUMENTS 5,663,115 A 9/1997 Naito et al.

FOREIGN PATENT DOCUMENTS

JP H08-197853 A 8/1996
JP H08-512001 A 12/1996
(Continued)

OTHER PUBLICATIONS

International Search Report and Written Opinion issued in connection with PCT Application No. PCT/JP2018/015204, dated Jun. 12, 2018. (12 pages).

*Primary Examiner* — Ian A Rummel
(74) *Attorney, Agent, or Firm* — K&L Gates LLP

(57) ABSTRACT

A three-dimensional structure according to an embodiment of the present disclosure includes: a plurality of resin layers including a light curable resin, the light curable resin including a coloring compound, a color developing-reducing agent, and a photothermal conversion agent, the plurality of resin layers being stacked, the color developing-reducing agent having an average particle diameter of 10 μm or more and 100 μm or less.

15 Claims, 4 Drawing Sheets

(56) References Cited

FOREIGN PATENT DOCUMENTS

| | | |
|---|---|---|
| JP | 2002-001828 A | 1/2002 |
| JP | 2004-249544 A | 9/2004 |
| JP | 2005205882 A | 8/2005 |
| JP | 2006-088645 A | 4/2006 |
| JP | 2014-136311 A | 7/2014 |
| JP | 2016-097538 A | 5/2016 |
| WO | 95/01257 A1 | 1/1995 |

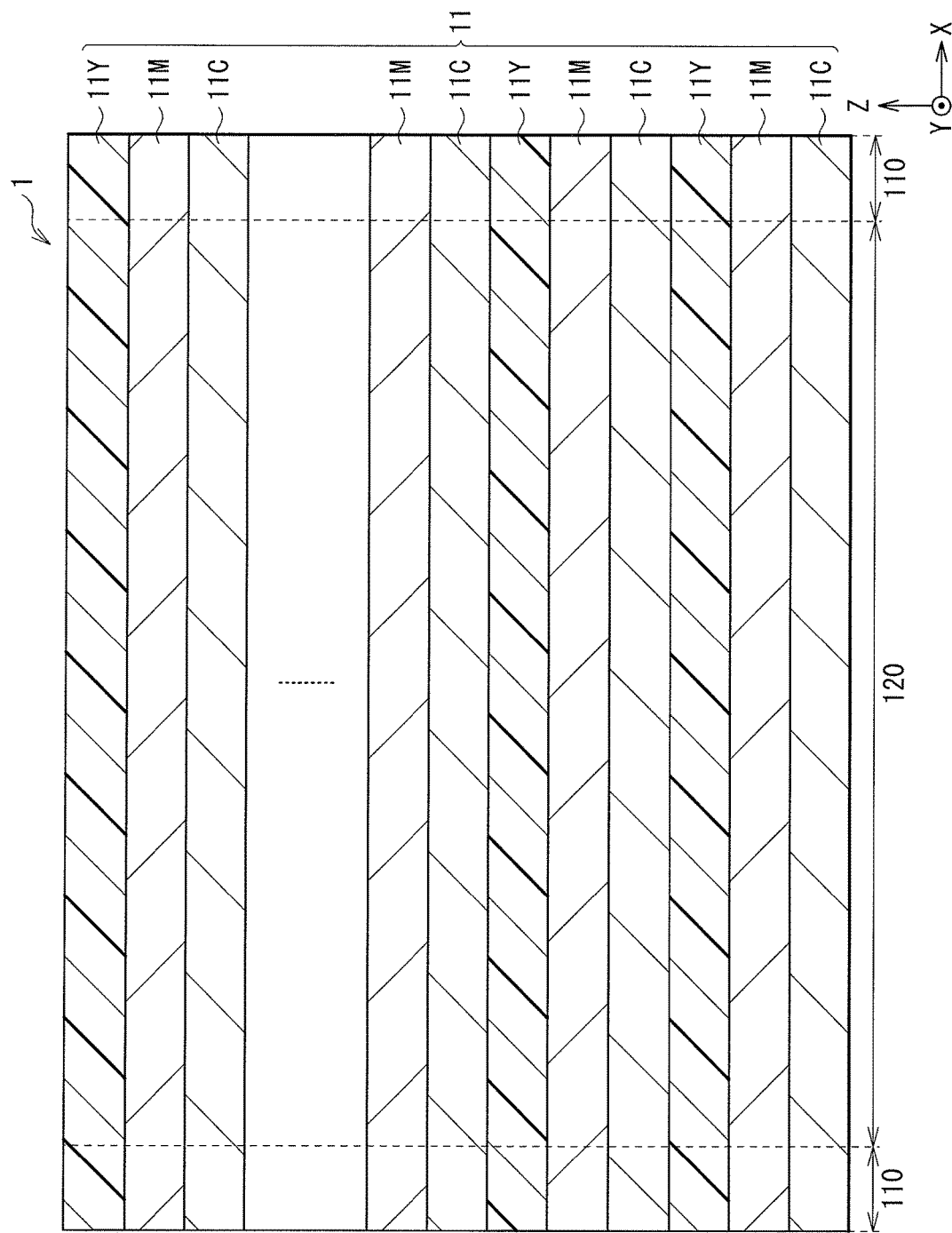

[ FIG. 2 ]
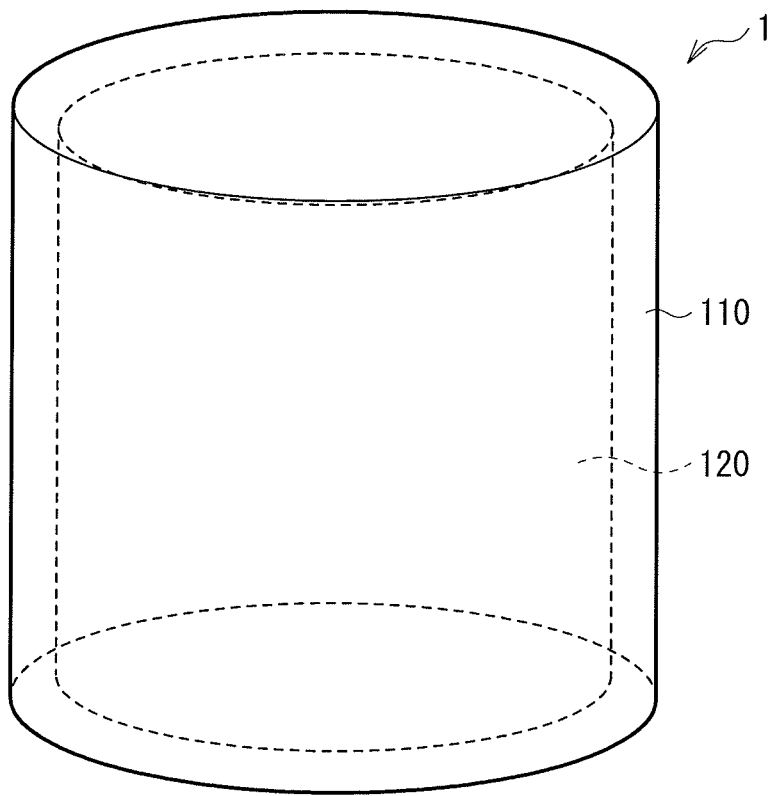
[ FIG. 3 ]
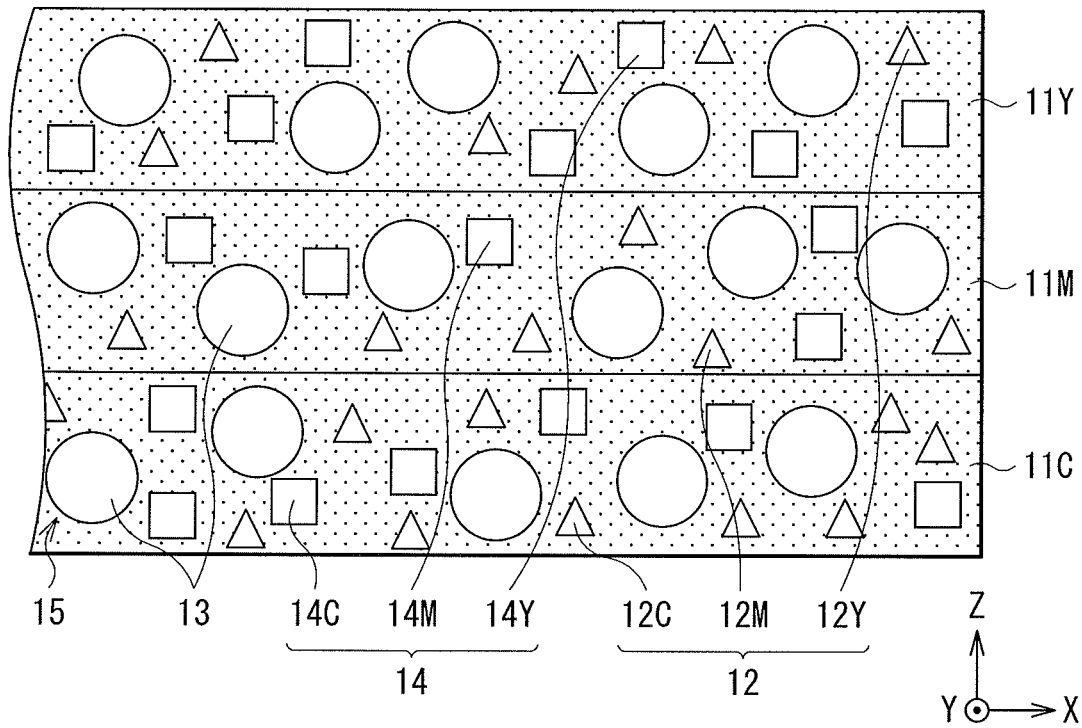

[ FIG. 4 ]
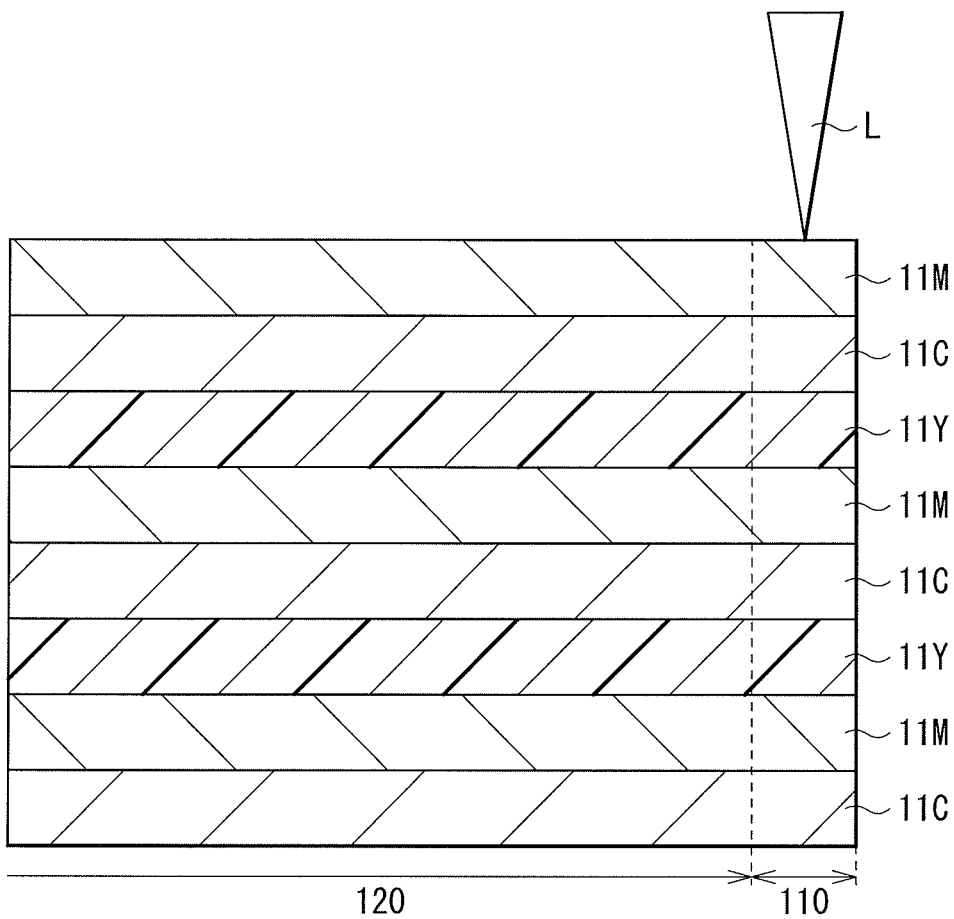
[ FIG. 5 ]
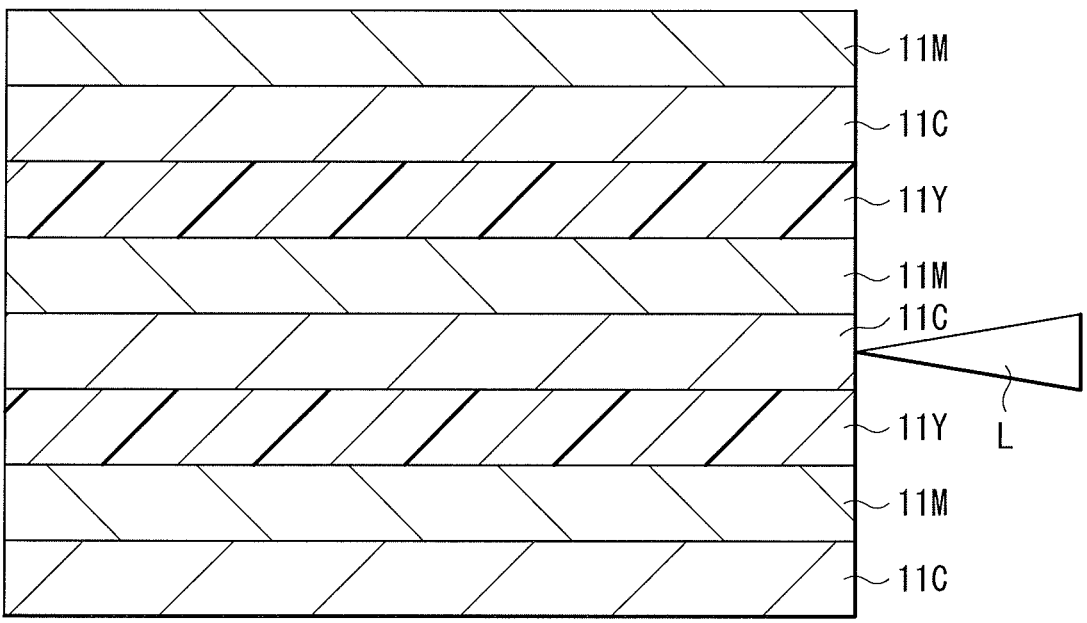

[ FIG. 6 ]
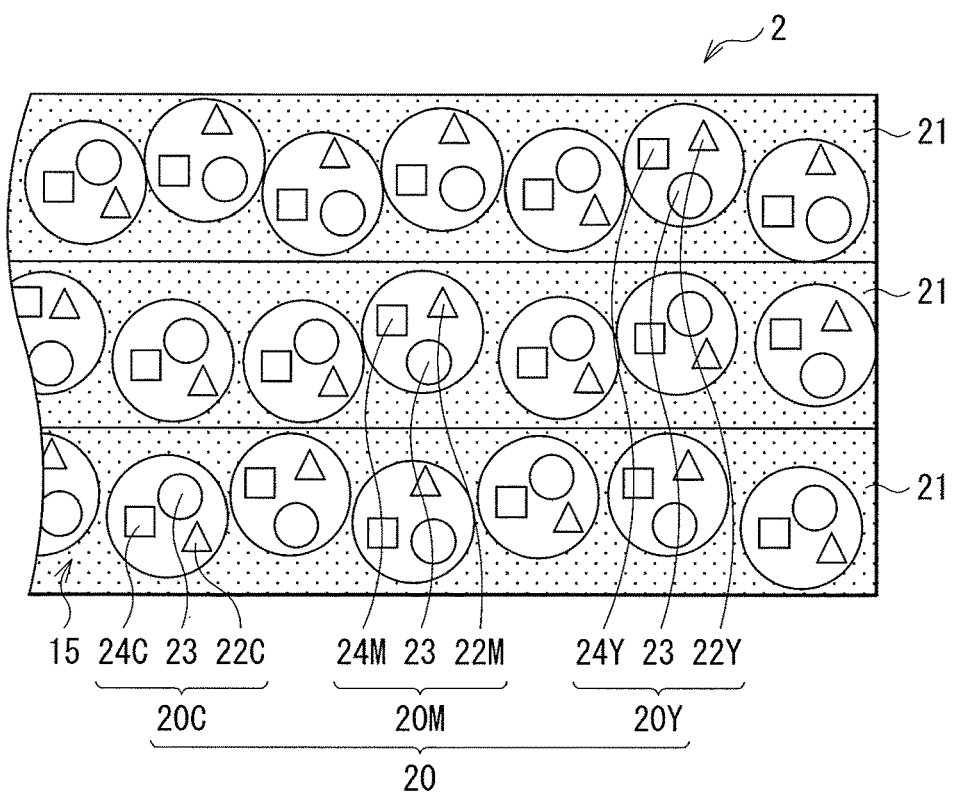
[ FIG. 7 ]
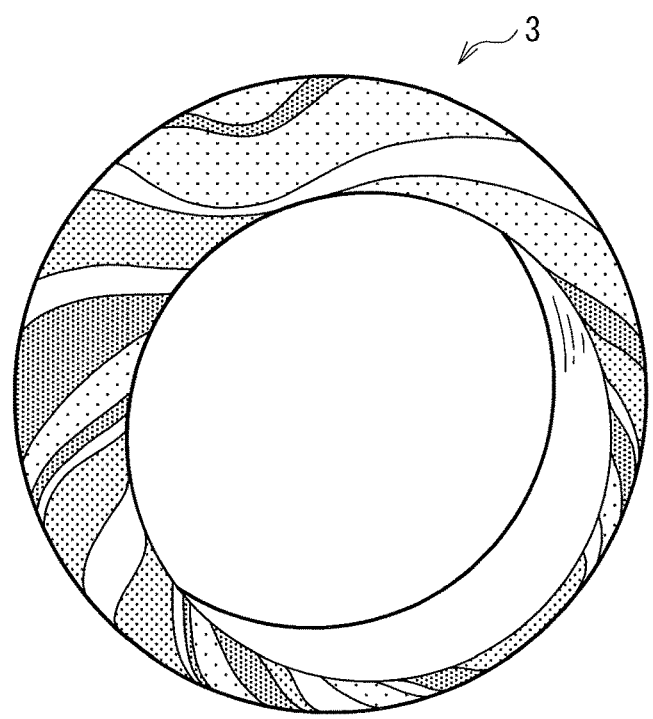

… (1)

THREE-DIMENSIONAL STRUCTURE AND METHOD OF MANUFACTURING THREE-DIMENSIONAL STRUCTURE

TECHNICAL FIELD

The present disclosure relates, for example, to a three-dimensional structure including a leuco dye and a method of manufacturing the three-dimensional structure.

BACKGROUND ART

In recent years, as technology for manufacturing a three-dimensional object having an optional three-dimensional shape, additive manufacturing technology for solidifying a fluid material on the basis of three-dimensional data has been developed, and the technology is generally known as 3D printer.

The 3D printer makes it possible to easily produce a three-dimensional shape having a free-form surface or a complicated structure, which is difficult to cut in a method of creating a three-dimensional object by machining. In addition, the 3D printer makes it possible to obtain a desired three-dimensional shape by fully automated processes without causing wear of necessary tools for machining, noise, cutting chips, etc. For example, PTL 1 discloses an optical modeling apparatus including a first light source, an operation device, a second light source, and a spatial light modulator. The first light source emits a light beam for drawing on a light curable resin. The operation device performs scanning over the light curable resin with the light beam emitted from the first light source. The second light source emits light that is applied to each fixed region on the light curable resin. The spatial light modulator spatially modulates the light emitted from the second light source to perform one-shot exposure on a predetermined region of the light curable resin.

CITATION LIST

Patent Literature

PTL 1: Japanese Unexamined Patent Application Publication No. 2008-155480

SUMMARY OF THE INVENTION

Incidentally, in a three-dimensional structure manufactured with use of a 3D printer or the like, it is difficult to selectively color a desired portion such as a surface, an interior, or the entirety of the three-dimensional structure, and it is desired to improve designability.

It is desirable to provide a three-dimensional structure and a method of manufacturing a three-dimensional structure that make it possible to improve designability.

A three-dimensional structure according to an embodiment of the present disclosure includes a plurality of resin layers including a light curable resin, the light curable resin including a coloring compound, a color developing-reducing agent, and a photothermal conversion agent, the plurality of resin layers being stacked, the color developing-reducing agent having an average particle diameter of 10 μm or more and 100 μm or less.

A method of manufacturing a three-dimensional structure according to an embodiment of the present disclosure including: forming a film including a light curable resin as a resin layer, the light curable resin including a coloring compound, a color developing-reducing agent having an average particle diameter of 10 μm or more and 100 μm or less, and a photothermal conversion agent; and stacking a plurality of the resin layers.

In the three-dimensional structure according to the embodiment of the present disclosure and the method of manufacturing the three-dimensional structure according to the embodiment of the present disclosure, the resin layers are formed with use of the light curable resin including the coloring compound, the color developing-reducing agent having an average particle diameter of 10 μm or more and 100 μm or less, and the photothermal conversion agent. This makes it possible to form a white portion in an interior by scattering of light by the color developing-reducing agent, thereby coloring a surface and improving color reproducibility.

According to the three-dimensional structure according to the embodiment of the present disclosure and the method of manufacturing the three-dimensional structure according to the embodiment of the present disclosure, as materials of the resin layers, the coloring compound, the color developing-reducing agent having an average particle diameter of 10 μm or more and 100 μm or less, and the photothermal conversion agent are used together with the light curable resin, which makes it possible to form a white portion in the interior by scattering of light by the color developing-reducing agent. This makes it possible to color the surface and to improve color reproducibility and designability of the three-dimensional structure.

It is to be noted that effects described here are not necessarily limitative, and may be any of effects described in the present disclosure.

BRIEF DESCRIPTION OF DRAWINGS

FIG. 1 is a schematic cross-sectional view of a configuration of a three-dimensional structure according to a first embodiment of the present disclosure.

FIG. 2 is an overall view of the three-dimensional structure illustrated in FIG. 1.

FIG. 3 is a schematic view describing a composition of each of resin layers included in the three-dimensional structure illustrated in FIG. 1.

FIG. 4 is a schematic view of a portion of a process in an example of a method of manufacturing the three-dimensional structure illustrated in FIG. 1.

FIG. 5 is a schematic view of a portion of a process in another example of the method of manufacturing the three-dimensional structure illustrated in FIG. 1.

FIG. 6 is a schematic view describing a composition of a resin layer included in a three-dimensional structure according to a second embodiment of the present disclosure.

FIG. 7 is a perspective view of an appearance of an application example.

MODES FOR CARRYING OUT THE INVENTION

Some embodiments of the present disclosure are described below in detail with reference to the drawings. It is to be noted that the following description is given of specific examples of the present disclosure, and the present disclosure is not limited to the following embodiments. Description is given in the following order.

1. First Embodiment (an example in which a resin layer is formed with use of a light curable region in which a leuco dye, a color developing-reducing agent, and a photothermal conversion agent are dispersed)
  1-1. Configuration of Three-Dimensional Structure
  1-2. Method of Manufacturing Three-Dimensional Structure
  1-3. Workings and Effects
  2. Second Embodiment (an example in which a resin layer is formed with use of a light curable resin in which microcapsules containing a leuco dye, a color developing-reducing agent, and a photothermal conversion agent are dispersed)
  2-1. Configuration of Three-Dimensional Structure
  2-2. Workings and Effects
  3. Application Examples 1. First Embodiment FIG. 1 schematically illustrates a cross-sectional configuration of a three-dimensional structure (a three-dimensional structure 1) according to a first embodiment of the present disclosure. FIG. 2 illustrates the entirety of the three-dimensional structure 1 illustrated in FIG. 1. FIG. 3 is a schematic view describing a composition of each of resin layers 11 (resin layers 11C, 11M, and 11Y) included in the three-dimensional structure 1 illustrated in FIG. 1. The three-dimensional structure 1 is an object obtained by a 3D printer, for example, and includes, for example, the resin layers 11 that are stacked in order on a light curable resin. The resin layers 11 are cured by irradiation with light. The three-dimensional structure 1 according to the present embodiment includes, for example, a plurality of resin layers 11 that is stacked and includes a light curable resin 15 including a leuco dye 12 (a coloring compound), a color developing-reducing agent 13, and a photothermal conversion agent 14, and a color developing-reducing agent having an average particle diameter of 10 μm or more and 100 μm or less is used as the color developing-reducing agent 13. The three-dimensional structure 1 has a coloring region 110 formed in proximity to a surface thereof, and a scattering region 120 exhibiting white formed in an interior thereof. It is to be noted that FIG. 1 schematically illustrates a cross-sectional configuration of a portion of the three-dimensional structure 1, of which dimensions and shapes may be different from actual dimensions and actual shapes.

(1-1. Configuration of Three-Dimensional Structure)

The three-dimensional structure 1 according to the present embodiment includes the plurality of resin layers 11 that are stacked. The resin layers 11 include, for example, a plurality of types of layers exhibiting colors different from each other. Specifically, the resin layers 11 according to the present embodiment include a resin layer 11C exhibiting cyan (C), a resin layer 11M exhibiting magenta (M), and a resin layer 11Y exhibiting yellow (Y). This allows for full-color coloring. Each of the resin layers 11C, 11M, and 11Y includes a coloring compound exhibiting a corresponding color (a leuco dye 12C, 12M, or 12Y), the color developing-reducing agent 13, and a photothermal conversion agent 14C, 14M, or 14Y. The photothermal conversion agents 14C, 14M, and 14Y have absorption wavelengths different from each other.

The resin layers 11 preferably include a resin in which the leuco dye 12, the color developing-reducing agent 13, and the photothermal conversion agent 14 are easily and uniformly dispersed and that has light transparency. In addition, the resin layers 11 are preferably cured by irradiation with light (e.g., a laser), and preferably uses a light curable resin 15. As the light curable resin 15, it is desirable to use an ultraviolet curable resin that is cured by irradiation with ultraviolet light that has high energy density and is possible to narrow a laser spot diameter. Thus, a highly accurate shaped object is obtainable.

As described above, in the resin layers 11, for example, the resin layer 11C (a first layer) exhibiting cyan, the resin layer 11M (a second layer) exhibiting magenta, and the resin layer 11Y (a third layer) exhibiting yellow are repeatedly stacked in this order. Thicknesses of the respective resin layers 11C, 11M, and 11Y are preferably, for example, less than or equal to a limit of human visibility, and is preferably, for example, greater than or equal to 10 μm and less than or equal to 50 μm.

The leuco dye 12 (12C, 12M, and 12Y) is colored, for example, in a case where a lactone ring included in a molecule reacts with, for example, an acid to be turned to an open ring form, and becomes colorless in a case where the lactone ring in the open ring form reacts with, for example, a base to be turned to a closed ring form. One specific example of the leuco dye 12 is a compound that includes an electron-donating group in a molecule and is represented by the following formula (1). The leuco dye 12 corresponds to a specific example of a "coloring compound" in the present disclosure.

[Chem. 1]

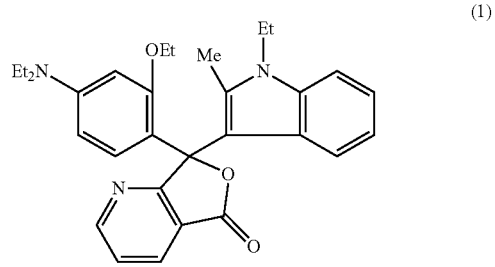

(1)

For example, the color developing-reducing agent 13 causes the colorless leuco dyes 12C, 12M, and 12Y to be colored or causes the leuco dyes 12C, 12M, and 12Y exhibiting a predetermined color to become colorless. An example of the color developing-reducing agent 13 is a compound that has a salicylic acid skeleton represented by the following general formula (2) and includes an electron-accepting group in a molecule. It is to be noted that different color developing-reducing agents 13 may be used for respective resin layers 11C, 11M, and 11Y, or the same color developing-reducing agent 13 may be used.

[Chem. 2]

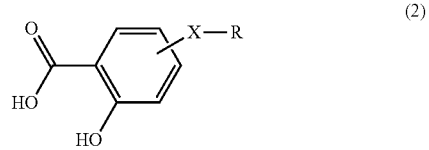

(2)

(where X is any of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—, and R is a straight-chain hydrocarbon group having a carbon number of 25 to 34.)

The color developing-reducing agent 13 according to the present embodiment preferably has, for example, an average particle diameter of 10 μm or more and 100 μm or less, and more preferably an average particle diameter of 20 μm or more and 30 μm or less. Accordingly, outside light having entered the three-dimensional structure 1 is scattered more by the color developing-reducing agent 13 toward the interior of the three-dimensional structure 1 to form a region exhibiting white (the scattering region 120) in the interior of the three-dimensional structure 1, as illustrated in FIG. 2. Depending on the average particle diameter of the color developing-reducing agent 13, and the volume content of the color developing-reducing agent 13 in the resin layer, scattering efficiency of the outside light is low in proximity to the surface of the three-dimensional structure 1. Accordingly, coloring of the leuco dye 12 in proximity to the surface of the three-dimensional structure 1 is visually recognized from outside. In the three-dimensional structure 1, in terms of designability and color reproductivity, the coloring region 110 is preferably formed, for example, at a thickness of 3 μm or more and 30 μm or less from the surface. Accordingly, the color developing-reducing agent 13 is preferably included in the resin layer 11 at 25 vol % or more and 50 vol % or less.

The photothermal conversion agent 14 (14C, 14M, and 14Y) absorbs, for example, light in a predetermined wavelength range of a near-infrared region to generate heat. As the photothermal conversion agent 14, for example, it is preferable to use a near-infrared absorbing dye having an absorption peak in a wavelength range from 700 nm to 2000 nm both inclusive and hardly having absorption in a visible region.

Specific examples thereof include a compound having a phthalocyanine skeleton (a phthalocyanine-based dye), a compound having a squarylium skeleton (a squarylium-based dye), inorganic compounds, and the like, for example. The inorganic compounds include a metal complex such as a dithio complex, a diimonium salt, an aminium salt, an inorganic compound, and the like. Examples of the inorganic compounds include graphite, carbon black, metal powder particles, tricobalt tetraoxide, iron oxide, chromium oxide, copper oxide, titanium black, metal oxides such as ITO, metal nitrides such as niobium nitride, metal carbides such as tantalum carbide, metal sulfides, and various magnetic powders. Alternatively, a compound that has superior light resistance and superior heat resistance and has a cyanine skeleton (a cyanine-based dye) may be used. In the present embodiment, three kinds of photothermal conversion agents 14C, 14M, and 14Y are used, and desirably absorb light in wavelength ranges different from each other to generate heat.

It is to be noted that the superior light resistance herein means not causing decomposition during laser irradiation. The superior heat resistance means not changing a maximum absorption peak value of an absorption spectrum by 20% or more, for example, in a case where a film is formed together with a polymer material and stored at 150° C. for 30 minutes. Examples of such a compound having the cyanine skeleton include a compound having, in a molecule, at least one of a counter ion of any of $SbF_6$, $PF_6$, $BF_4$, $ClO_4$, $CF_3SO_3$, and $(CF_3SO_3)_2N$ or a methine chain including a five-membered ring or a six-membered ring. It is to be noted that the compound having the cyanine skeleton used in the three-dimensional structure according to the present embodiment preferably include both any of the counter ions described above, and a cyclic structure such as the five-membered ring and the six-membered ring in a methine chain, but if the compound having the cyanine skeleton includes at least one of any of the counter ions or the cyclic structure, sufficient light resistance and sufficient heat resistance are secured.

The resin layers 11 (11C, 11M, and 11Y) each include at least one kind of the leuco dye 12 (12C, 12M, or 12Y), at least one kind of the color developing-reducing agents 13, and at least one kind of the photothermal conversion agent 14 (14C, 14M, or 14Y). The leuco dye 12 (12C, 12M, and 12Y) and the color developing-reducing agent 13 is preferably included in the resin layers 11 at a ratio of the leuco dye:the color developing-reducing agent=1:2 (in weight ratio). The photothermal conversion agent 14 varies depending on film thicknesses of the resin layers 11. Further, in addition to the above-described materials, the resin layers 11 may include various additives such as a sensitizer and an ultraviolet absorber.

It is to be noted that, although not illustrated, it is preferable to form, for example, a transparent protective layer on the surface of the three-dimensional structure 1. The protective layer protects surfaces of the resin layers 11, and is formed with use of, for example, an ultraviolet curable resin or a thermosetting resin. A thickness of the protective layer is, for example, greater than or equal to 0.1 μm less than or equal to 20 μm.

Further, for example, a heat insulating layer may be provided between the resin layers 11C, 11M, and 11Y. This makes it possible to easily prevent coloring of the resin layers 11 other than the desired resin layer 11. Examples of a material of the heat insulating layer include a polymer material included in microcapsules 20C, 20M, and 20Y to be described later. Alternatively, an inorganic material having light transparency may be used. For example, porous silica, alumina, titania, carbon nanotubes, a composite thereof, or the like is preferably used, which decreases thermal conductivity, resulting in a high thermal insulating effect.

(1-2. Method of Manufacturing Three-Dimensional Structure)

It is possible to manufacture the three-dimensional structure 1 according to the present embodiment with use of, for example, a 3D printer, and the three-dimensional structure 1 is manufactured with use of, for example, the following method.

FIG. 4 schematically illustrates a portion of a process in an example of a method of manufacturing the three-dimensional structure 1. First, the leuco dye 12C, the color developing-reducing agent 13, and the photothermal conversion agent 14C are added to a liquid ultraviolet curable resin, and then are dispersed or dissolved in the liquid ultraviolet curable resin to obtain a paint C for the resin layer 11C. A paint M for the resin layer 11M and a paint Y for the resin layer 11Y are prepared in a similar manner. Subsequently, the paint C, the paint M, and the paint Y are applied onto a base material, and cured in this order to form and stack the resin layer 11C, the resin layer 11M, and the resin layer 11Y in this order.

Specifically, for example, the paint C is applied, for example, with a thickness of 50 μm onto the base material, and the paint C is cured by irradiation with ultraviolet light to form the resin layer 11C. At this time, a peripheral portion serving as the coloring region 110 of the resin layer 11C in proximity to the surface of the three-dimensional structure 1 is irradiated with a laser L having a wavelength of, for example, 900 nm to 1000 nm simultaneously with irradiation with ultraviolet light to be colored as appropriate.

Performing irradiation with ultraviolet light and irradiation with the laser L having a predetermined wavelength in the same process in such a manner makes it possible to use the same optical system for ultraviolet light for resin curing and the laser L for coloring, thereby allowing for reduction in manufacturing costs. Thereafter, the resin layers 11M and 11Y are formed similarly to the resin layer 11C. Specifically, for example, the paint M is applied with a thickness of, for example, 50 μm onto the resin layer 11C, and then the paint M is cured and a desired portion is colored by irradiation with ultraviolet light and the laser L having a wavelength of, for example, 800 nm to 900 nm. Subsequently, for example, the paint Y is applied with a thickness of, for example, 50 μm onto the resin layer 11M, and then the paint Y is cured and a desired portion is colored by irradiation with ultraviolet light and the laser L having a wavelength of, for example, 700 nm to 800 nm. Thereafter, for example, the resin layer 11C, the resin layer 11M, and the resin layer 11Y are formed and stacked in order to form the three-dimensional structure 1 having a desired shape.

In addition, a method other than the above-described method may be used for drawing (coloring) in the three-dimensional structure 1. FIG. 5 schematically illustrates a portion (a drawing process) of a process in an example of the method of manufacturing the three-dimensional structure illustrated in FIG. 1. In this method, the resin layer 11C, the resin layer 11M, and the resin layer 11Y are formed and stacked in order to form the three-dimensional structure 1 having a desired shape, and thereafter, desired positions in the resin layer 11C, the resin layer 11M, and the resin layer 11Y are colored. Specifically, for example, as illustrated in FIG. 4, for example, irradiating, with the laser L, a position where a drawing is desired to be made from a plane direction of each of the resin layers 11C, 11M, and 11Y makes it possible to make a drawing on the surface of the three-dimensional structure 1.

In addition, it is possible for the leuco dye 12 to become colorless by being heated to a predetermined temperature. Using this heating process and a drawing method illustrated in FIG. 4 in combination makes it possible to renew the drawing made on the three-dimensional structure 1.

Further, the leuco dyes 12C, 12M, and 12Y may color not only the coloring region 110 but also the scattering region 120. Coloring of the leuco dyes 12C, 12M, and 12Y in the scattering region is obscured by scattering of light by the color developing-reducing agent 13, which causes the scattering region 120 to exhibit a paler color than a color exhibited in the coloring region 110. A contrast ratio varies depending on a colored position. Using this makes it possible to perform complicated coloring.

(1-3. Workings and Effects)

As described above, in recent years, as technology for manufacturing a three-dimensional object having an optional three-dimensional shape, additive manufacturing technology for solidifying a fluid material on the basis of three-dimensional data has been developed. This technology is generally known as 3D printer, and, for example, resin layers (cured layers) formed by curing a light curable resin by irradiation with light are formed in order, thus making it possible to from an object having a desired shape. In a three-dimensional structure manufactured with use of a 3D printer or the like, it is however difficult to selectively color a desired portion such as a surface, an interior, or the entirety of the three-dimensional structure, and designability is insufficient.

As a method of coloring a three-dimensional object, for example, it is conceivable to interpose an ink or a pigment in the middle of forming cured layers in order, but it is difficult to color a specific portion. In addition, in this method, it is difficult to restore the portion once the portion is colored.

In contrast, in the three-dimensional structure 1 according to the present embodiment, the leuco dye 12, the color developing-reducing agent 13 having an average particle diameter of 10 μm or more and 100 μm or less, and the photothermal conversion agent 14 are dispersed in the light curable resin 15. This makes it possible to represent white, which is difficult to represent by the leuco dye 12, by scattering of outside light by the color developing-reducing agent 13. That is, a white portion is formed in the interior of the three-dimensional structure 1, which makes it possible to color the surface and to improve color reproductivity.

As described above, in the three-dimensional structure 1 according to the present embodiment, the color developing-reducing agent 13 having an average particle diameter of 10 μm or more and 100 μm or less is dispersed together with the leuco dye 12 and the photothermal conversion agent 14 in the light curable resin 15, and a thus-obtained material is used to form and stack a plurality of resin layers 11. This makes it possible to form a white portion in the interior of the three-dimensional structure 1 and color the surface. In addition, this makes it possible to improve color reproductivity. Accordingly, it is possible to improve designability of the three-dimensional structure 1.

In addition, the leuco dye 12 is allowed to reversibly switch between two states, i.e., a colored state and a colorless state. This makes it possible to renew the drawing (coloring) made on the three-dimensional structure 1 in the present embodiment.

Further, in the present embodiment, three kinds of leuco dyes 12C, 12M, and 12Y exhibiting cyan, magenta, and yellow are used as the leuco dye 12, and three kinds of photothermal conversion agents 14C, 14M, and 14Y having absorption wavelengths different from each other are used corresponding to the three kinds of leuco dyes 12C, 12M, and 12Y. This allows for full-color coloring, and allows for a further improvement in designability.

Next, description is given of a second embodiment of the present disclosure. Hereinafter, components similar to those of the foregoing first embodiment are denoted by same reference numerals, and description thereof is omitted as appropriate.

2. Second Embodiment

FIG. 6 schematically illustrates a composition of a resin layer included in a three-dimensional structure (a three-dimensional structure 2) according to the second embodiment of the present disclosure. The three-dimensional structure 2 is an object obtained by a 3D printer, for example, similarly to the three-dimensional structure 1 described above, and includes, for example, cured layers that are stacked in order. The cured layers are formed by curing a light curable resin by irradiation with light. The three-dimensional structure 2 according to the present embodiment is formed by preparing three kinds of microcapsules 20 (20C, 20M, and 20Y) in which leuco dyes 22C, 22M, and 22Y exhibiting different colors (for example, cyan (C), magenta (M), and yellow (Y)) are respectively encapsulated and forming resin layers 21 with use of the light curable resin 15 in which the three kinds of microcapsules 20C, 20M, and 20Y are dispersed. It is to be noted that FIG. 6 schematically illustrates a cross-sectional configuration of a portion of the three-dimensional structure 2, of which dimensions and shapes may be different from actual dimensions and actual shapes.

(2-1. Configuration of Three-Dimensional Structure)

The three-dimensional structure 2 according to the present embodiment includes a plurality of resin layers 21 that are stacked. In the resin layers 21, three kinds of microcapsules 20C, 20M, and 20Y are dispersed as described above. In addition to the leuco dyes 22C, 22M, and 22Y, a color developing-reducing agent 23 is encapsulated in each of the microcapsules 20C, 20M, and 20Y, and three kinds of photothermal conversion agents 24C, 24M, and 24Y having absorption wavelengths different from each other are respectively encapsulated in the microcapsules 20C, 20M, and 20Y.

The microcapsules 20C, 20M, and 20Y is formed with use of, for example, a polymer material having a heat insulating property and light transparency. Examples of such a material include polyvinyl chloride, polyvinyl acetate, vinyl chloride-vinyl acetate copolymer, ethylcellulose, polystyrene, styrenic copolymer, phenoxy resin, polyester, aromatic polyester, polyurethane, polycarbonate, polyacrylic acid ester, polymethacrylic acid ester, acrylic acid copolymer, maleic acid polymer, polyvinyl alcohol, modified polyvinyl alcohol, hydroxyethylcellulose, carboxymethylcellulose, starch, and the like, and copolymers thereof.

The color developing-reducing agent 23 encapsulated in the microcapsules 20C, 20M, and 20Y preferably has, for example, an average particle diameter of 10 µm or more and 100 µm or less, and more preferably an average particle diameter of 20 µm or more and 30 µm or less, similarly to the foregoing first embodiment. The content of the color developing-reducing agent 23 in the microcapsules 20C, 20M, and 20Y is preferably greater than or equal to 25 vol % and less than or equal to 50 vol %, for example.

It is to be noted that in a case where the microcapsules 20C, 20M, and 20Y each containing a corresponding one of the leuco dyes 22C, 22M, and 22Y, the color developing-reducing agent 23, and a corresponding one of the three kinds of photothermal conversion agents 24C, 24M, and 24Y having absorption wavelengths different from each other are used as with the present embodiment, the average particle diameter of the color developing-reducing agent 23 may not be necessarily within the range described above. For example, the content of a generally used color developing-reducing agent having an average particle diameter of about 1 µm to about 1.5 µm in the microcapsules 20C, 20M, and 20Y is adjusted to be greater than or equal to 25 vol % and less than or equal to 50 vol % as described above, which makes it possible to simulatively regard the color developing-reducing agent as the color developing-reducing agent 23 having an average particle diameter of 10 µm or more and 100 µm or less.

It is to be noted that the microcapsules 20C, 20M, and 20Y may include various additives such as an ultraviolet absorber, for example. Alternatively, in addition to the leuco dyes 22C, 22M, and 22Y, the additives described above may be encapsulated in the microcapsules 20C, 20M, and 20Y together with the color developing-reducing agent 23 and three kinds of photothermal conversion agents 24C, 24M, and 24Y having absorption wavelengths different from each other.

(3-2. Workings and Effects)

As described above, in the three-dimensional structure 2 according to the present embodiment, the microcapsules 20C, 20M, and 20Y each containing one type of leuco dyes 22C, 22M, and 22Y, the color developing-reducing agent 23, and one kind of photothermal conversion agents 24C, 24M, and 24Y having absorption wavelength different from each other are formed, and dispersed in the light curable resin 15. This makes it possible to form the three-dimensional structure 2 with use of one kind of paint, for example, as compared with the first embodiment in which three kinds of paints (the paint C, the paint M, and the paint Y) each including corresponding materials are prepared, and, for example, the paint C, the paint M, and the paint Y are applied and cured in this order, and stacked in order. Accordingly, an effect of simplifying manufacturing processes is achieved together with effects similar to those in the first embodiment.

3. Application Examples

Next, description is given of application examples of the three-dimensional structure (for example, the three-dimensional structure 1) described in the foregoing first and second embodiments. However, a configuration described below is merely an example, and the configuration can be changed as appropriate.

FIG. 7 illustrates an appearance of a bungle as an example of a three-dimensional structure 3. The resin layers included in a bungle 3 have a configuration described in the foregoing first embodiment and the foregoing second embodiment, which makes it possible to draw a complicated and brightly colored pattern as illustrated in FIG. 7. The three-dimensional structures 1 and 2 described above are applicable to a portion of any of clothing ornaments and various electronic apparatuses in such a manner. Examples of the clothing ornaments and the electronic apparatuses include clocks (watches) as so-called wearable terminals, portions of clothing ornaments such as bags, clothing, headwear, spectacles, and footwear, and ornaments such as figurines, and kinds thereof are not particularly limited.

Although the present disclosure has been described with reference to the first and second embodiments and the application examples, the present disclosure is not limited to modes described in the foregoing embodiments and the like, and may be modified in a variety of ways. For example, it is not necessary to include all the components described in the foregoing first and second embodiments, and any other component may be further included. In addition, the materials and thicknesses of the components described above are merely illustrative, and are not limited to those described above.

For example, the leuco dyes 12C, 12M, and 12Y used for the resin layers (for example, the resin layers 11C, 11M, and 11Y) exhibiting respective colors (cyan (C), magenta (M), and yellow (Y)) may use a mixture of a plurality of kinds of materials exhibiting colors different from each other. It is difficult to reproduce CMY (cyan, magenta, and yellow) of Japan Color with use of a single coloring compound (a leuco dye). In addition, the photothermal conversion agent has a slight tint, which causes the tint of each resin layer to change slightly depending on the kind and content of the photothermal conversion agent. Developing the leuco dye for each slight change significantly reduces production efficiency. Accordingly, it is possible to reproduce various colors including CMY of Japan Color by forming a mixture of a plurality of kinds of leuco dyes. For example, it is possible to reproduce cyan by mixing a leuco dye exhibiting blue and a leuco dye exhibiting green at a predetermined ratio. It is possible to reproduce magenta by mixing a leuco dye exhibiting red and a leuco dye exhibiting orange at a predetermined ratio.

It is to be noted that effects described in this specification are merely illustrative and non-limiting, and other effects may be included.

It is to be noted that the present disclosure may have the following configurations.

(1)
A three-dimensional structure including:
a plurality of resin layers including a light curable resin, the light curable resin including a coloring compound, a color developing-reducing agent, and a photothermal conversion agent, the plurality of resin layers being stacked,
the color developing-reducing agent having an average particle diameter of 10 µm or more and 100 µm or less.

(2)
The three-dimensional structure according to (1), in which the color developing-reducing agent is included in the resin layers at 25 vol % or more and 50 vol % or less.

(3)
The three-dimensional structure according to (1) or (2), in which the color developing-reducing agent has an average particle diameter of 20 µm or more and 30 µm or less.

(4)
The three-dimensional structure according to any one of (1) or (3), in which the plurality of resin layers includes a plurality of kinds of coloring compounds exhibiting different colors.

(5)
The three-dimensional structure according to any one of (1) to (4), in which the plurality of resin layers includes a plurality of kinds of resin layers exhibiting colors different from each other.

(6)
The three-dimensional structure according to (5), in which
the plurality of resin layers includes a first layer, a second layer, and a third layer as the plurality of kinds of resin layers, and
the first layer, the second layer, and the third layer include the coloring compounds exhibiting colors different from each other, and are repeatedly stacked in this order.

(7)
The three-dimensional structure according to any one of (4) to (6), in which the plurality of kinds of coloring compounds is encapsulated in respective different capsules, and is dispersed in the plurality of resin layers.

(8)
The three-dimensional structure according to any one of (1) to (7), in which the plurality of resin layers includes a plurality of kinds of photothermal conversion agents having different absorption wavelengths.

(9)
The three-dimensional structure according to any one of (5) to (8), in which the plurality of kinds of resin layers includes the photothermal conversion agents having different absorption wavelengths for the respective exhibited colors.

(10)
The three-dimensional structure according to any one of (1) to (9), in which an absorption peak wavelength of the photothermal conversion agent is greater than or equal to 700 nm and less than or equal to 2000 nm.

(11)
The three-dimensional structure according to any one of (1) to (10), in which the coloring compound includes a leuco dye.

(12)
A method of manufacturing a three-dimensional structure including:
forming a film including a light curable resin as a resin layer, the light curable resin including a coloring compound, a color developing-reducing agent having an average particle diameter of 10 µm or more and 100 µm or less, and a photothermal conversion agent; and
stacking a plurality of the resin layers.

(13)
The method of manufacturing the three-dimensional structure according to (12), in which the light curable resin is irradiated with ultraviolet light to form the resin layer.

(14)
The method of manufacturing the three-dimensional structure according to (13), in which a predetermined portion of the resin layer is colored by irradiation with a laser having a predetermined wavelength together with the ultraviolet light.

(15)
The method of manufacturing the three-dimensional structure according to (13) (14), in which the light curable resin is irradiated with ultraviolet light to form the resin layer, and after the plurality of the resin layers is stacked, a predetermined portion of the plurality of the resin layers stacked is colored by irradiation with a laser having a predetermined wavelength.

This application claims the benefit of Japanese Priority Patent Application JP2017-099628 filed with the Japan Patent Office on May 19, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A three-dimensional structure comprising:
a plurality of resin layers including a light curable resin, the light curable resin including a coloring compound, a color developing-reducing agent, and a photothermal conversion agent, the plurality of resin layers being stacked,
the color developing-reducing agent having an average particle diameter of 10 µm or more and 100 µm or less.

2. The three-dimensional structure according to claim 1, wherein the color developing-reducing agent is included in the resin layers at 25 vol % or more and 50 vol % or less.

3. The three-dimensional structure according to claim 1, wherein the color developing-reducing agent has an average particle diameter of 20 µm or more and 30 µm or less.

4. The three-dimensional structure according to claim 1, wherein the plurality of resin layers includes a plurality of kinds of coloring compounds exhibiting different colors.

5. The three-dimensional structure according to claim 1, wherein the plurality of resin layers includes a plurality of kinds of resin layers exhibiting colors different from each other.

6. The three-dimensional structure according to claim 5, wherein
the plurality of resin layers includes a first layer, a second layer, and a third layer as the plurality of kinds of resin layers, and
the first layer, the second layer, and the third layer include the coloring compounds exhibiting colors different from each other, and are repeatedly stacked in this order.

7. The three-dimensional structure according to claim 4, wherein the plurality of kinds of coloring compounds is encapsulated in respective different capsules, and is dispersed in the plurality of resin layers.

8. The three-dimensional structure according to claim 1, wherein the plurality of resin layers includes a plurality of kinds of photothermal conversion agents having different absorption wavelengths.

9. The three-dimensional structure according to claim 5, wherein the plurality of kinds of resin layers includes the photothermal conversion agents having different absorption wavelengths for the respective exhibited colors.

10. The three-dimensional structure according to claim 1, wherein an absorption peak wavelength of the photothermal conversion agent is greater than or equal to 700 nm and less than or equal to 2000 nm.

11. The three-dimensional structure according to claim 1, wherein the coloring compound comprises a leuco dye.

12. A method of manufacturing a three-dimensional structure comprising:
forming a film including a light curable resin as a resin layer, the light curable resin including a coloring compound, a color developing-reducing agent having an average particle diameter of 10 μm or more and 100 μm or less, and a photothermal conversion agent; and
stacking a plurality of the resin layers.

13. The method of manufacturing the three-dimensional structure according to claim 12, wherein the light curable resin is irradiated with ultraviolet light to form the resin layer.

14. The method of manufacturing the three-dimensional structure according to claim 13, wherein a predetermined portion of the resin layer is colored by irradiation with a laser having a predetermined wavelength together with the ultraviolet light.

15. The method of manufacturing the three-dimensional structure according to claim 13, wherein the light curable resin is irradiated with ultraviolet light to form the resin layer, and after the plurality of the resin layers is stacked, a predetermined portion of the plurality of the resin layers stacked is colored by irradiation with a laser having a predetermined wavelength.

* * * * *